US 7,775,426 B2

(12) United States Patent
Paul et al.

(10) Patent No.: US 7,775,426 B2
(45) Date of Patent: *Aug. 17, 2010

(54) METHOD AND SYSTEM FOR FACILITATING ELECTRONIC FUNDS TRANSACTIONS

(76) Inventors: David K. Paul, 4416 Santos Ranch Rd., Chico, CA (US) 95928; R. Scott Hatfield, 270 McLaughlin Way, Cohasset, CA (US) 95926

( * ) Notice: Subject to any disclaimer, the term of this patent is extended or adjusted under 35 U.S.C. 154(b) by 1031 days.

This patent is subject to a terminal disclaimer.

(21) Appl. No.: 11/507,938

(22) Filed: Aug. 21, 2006

(65) Prior Publication Data

US 2007/0045407 A1    Mar. 1, 2007

Related U.S. Application Data

(63) Continuation-in-part of application No. 10/128,153, filed on Apr. 22, 2002, now Pat. No. 7,104,443.

(60) Provisional application No. 60/285,922, filed on Apr. 23, 2001.

(51) Int. Cl.
*G07F 19/00* (2006.01)
*G06K 5/00* (2006.01)

(52) U.S. Cl. .................... 235/379; 235/380

(58) Field of Classification Search .................. 235/379, 235/380, 381, 382, 375, 492; 705/21, 44, 705/42, 19, 35, 38
See application file for complete search history.

(56) References Cited

U.S. PATENT DOCUMENTS

| | | | |
|---|---|---|---|
| 4,012,786 A | 3/1977 | McKie et al. | |
| 4,736,094 A | 4/1988 | Yoshida | |
| 5,255,182 A | 10/1993 | Adams | |
| 5,265,008 A | 11/1993 | Benton et al. | |
| 5,278,977 A | 1/1994 | Spencer et al. | |
| 5,448,047 A | 9/1995 | Nair et al. | |
| 5,457,305 A | 10/1995 | Akel et al. | |
| 5,663,546 A | 9/1997 | Cucinotta et al. | |
| 5,684,965 A | 11/1997 | Pickering | |
| 5,689,100 A | 11/1997 | Carrithers et al. | |
| 5,777,305 A | 7/1998 | Smith et al. | |
| 5,798,508 A | 8/1998 | Walker et al. | |

(Continued)

FOREIGN PATENT DOCUMENTS

EP    0666549 A1    8/1995

(Continued)

*Primary Examiner*—Thien M Le
(74) *Attorney, Agent, or Firm*—Connolly Bove Lodge & Hutz LLP

(57) ABSTRACT

A method and system for executing electronic funds transactions using a merchant-issued payment (MIP) card in a merchant-centric system having benefits which include reduced fees to acquiring merchants and optionally remitting a portion of the collected fees, or other incentive, to issuing merchants. The system also preferably provides information sharing on consumer transactions with merchants to facilitate consumer based incentive programs and the like. The system operates over conventional card processing infrastructure and utilizes the ACH network, or equivalent, to settle the transaction from a consumer checking account, or a merchant account in the case of a prepaid MIP card. Using the system, merchants may elect to qualify customers based on their own criterion. Embodiments are described for prepaid, fixed value, programmable, and refillable, forms of merchant-issued payment cards.

43 Claims, 9 Drawing Sheets

U.S. PATENT DOCUMENTS

| | | | |
|---|---|---|---|
| 5,825,003 | A | 10/1998 | Jennings et al. |
| 5,852,809 | A | 12/1998 | Abel et al. |
| 5,991,410 | A | 11/1999 | Albert et al. |
| 5,999,596 | A | 12/1999 | Walker et al. |
| 6,006,205 | A | 12/1999 | Loeb et al. |
| 6,065,675 | A | 5/2000 | Teicher |
| 6,105,865 | A | 8/2000 | Hardesty |
| 6,119,104 | A | 9/2000 | Brumbelow et al. |
| 6,122,625 | A | 9/2000 | Rosen |
| 6,138,911 | A | 10/2000 | Fredregill et al. |
| 6,169,974 | B1 | 1/2001 | Baumgartner et al. |
| 6,213,390 | B1 | 4/2001 | Oneda |
| 6,243,688 | B1 | 6/2001 | Kalina |
| 6,308,886 | B1 | 10/2001 | Benson et al. |
| 6,321,213 | B1 | 11/2001 | Ito et al. |
| 6,336,095 | B1 | 1/2002 | Rosen |
| 7,104,443 | B1 * | 9/2006 | Paul et al. .................... 235/380 |
| 7,424,455 | B2 * | 9/2008 | Kellogg et al. ................ 705/39 |
| 2007/0045407 | A1 * | 3/2007 | Paul et al. .................... 235/380 |
| 2007/0255620 | A1 * | 11/2007 | Tumminaro et al. ........... 705/14 |
| 2009/0119190 | A1 * | 5/2009 | Realini ........................ 705/30 |
| 2009/0150288 | A1 * | 6/2009 | Bishop et al. ................. 705/44 |
| 2009/0164331 | A1 * | 6/2009 | Bishop et al. ................. 705/19 |
| 2009/0319425 | A1 * | 12/2009 | Tumminaro et al. ........... 705/42 |

FOREIGN PATENT DOCUMENTS

| | | |
|---|---|---|
| GB | 2305393 A | 4/1997 |
| GB | 2338814 A | 12/1999 |
| WO | 95/12169 A1 | 5/1995 |
| WO | 96/38801 A1 | 12/1996 |
| WO | 01/82243 A2 | 11/2001 |

* cited by examiner

METHOD AND SYSTEM FOR FACILITATING ELECTRONIC FUNDS TRANSACTIONS

CROSS-REFERENCE TO RELATED APPLICATIONS

This application is a continuation-in-part of application Ser. No. 10/128,153 filed on Apr. 22, 2002, now U.S. Pat. No. 7,104,443, incorporated by reference herein in its entirety, which claims priority from U.S. provisional application Ser. No. 60/285,922 filed on Apr. 23, 2001, incorporated by reference herein in its entirety.

STATEMENT REGARDING FEDERALLY SPONSORED RESEARCH OR DEVELOPMENT

Not Applicable

REFERENCE TO A COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the public files or records of the United States patent and Trademark Office, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to electronic payment systems and more particularly to a financial instrument, in the form of a payment card, for use in executing electronic funds transactions.

2. Description of the Background Art

The volume of electronic payment transactions executed with credit cards, debit cards (on-line and off-line), and ATM cards at the point-of-sale has reached an annual level of approximately 45 billion point-of-sale (POS) transactions annually which represent over $1.1 Trillion in transactions. The transaction volume of electronic transactions is continuing to grow readily. Debit and checks currently represent 63% of total non-cash payments at the POS today and this percentage is expected to grow to 70% by 2010. Currently, 18 billion checks are processed annually with merchants incurring an estimated $23 billion in check handling and fraud costs. As debit cards gain wider acceptance, the use and volume of checks is declining. Debit transactions are surpassing credit transactions at the POS. It is anticipated that by 2010, non-cash POS transactions are expected to grow to 67 billion transactions with a transaction value of $4.6 Trillion (Nilson Report, Star System Inc.—Tower Group).

The policies and operating principles for executing electronic transactions is currently determined by issuing banks which charge substantial transaction fees for processing these non-cash transactions. The fees collected for executing the transactions are borne by the merchants, typically retailers, and these transaction fees have continued to escalate. Even current automated clearing house (ACH) "check-based" debit cards such as "VISA Check"™ by VISA® and "Master Money"™ by MasterCard® subject the retailers to the same rate schedule as conventional VISA, MasterCard, and other similar credit card products.

The transaction fee paid by the merchant for a moderately sized purchase of $60 can approach $0.75. It will be appreciated that since a large percentage of point-of-sale transactions are executed using credit cards, debit cards, and ATM cards, the overall cost per transaction may significantly impact merchant profitability. The trend has been toward increasing use of debit instruments in relation to checks and credit card instruments, while the transaction cost for these instruments continues to increase, at the expense of merchants that accept the cards for payment.

As conventional debit, credit, and ATM transaction instruments are under the control of issuing banks, merchants must follow the dictates of the banking institutions and consequently have no control over the process, and furthermore no access to consumer purchase information within the associated databases. As a result, the ability of merchants to establish retailer loyalty and frequent buyer programs is severely diminished.

Therefore, a need exists for a point of purchase card-based electronic payment system which provides conventional features to consumers while reducing merchant processing costs and increasing the ability of merchants to access consumer transaction information for use in their own special incentive programs. The present invention satisfies those needs, as well as others, and overcomes the deficiencies of previously developed electronic payment systems.

BRIEF SUMMARY OF THE INVENTION

The invention provides a method and system for executing electronic funds transactions in which merchant issuers of secure merchant-issued cards, such as merchant-issued payment cards, and merchant acquirers of those cards execute electronic transactions via the current ACH network, or similar settlement switch, while reducing transaction costs and maintaining a measure of information control. It should be noted that the ACH network is accessible to all merchants wherein communication with the ACH network is thus referred to herein as being conventional and non-proprietary. Transactions executed at acquiring merchants are subject to the collection of transaction fees. According to one preferred embodiment a portion of this fee is later disbursed in some form to the merchant that issued the card used for a given transaction.

The teachings generally describe a system of interoperable retailer branded payment cards that utilize the ACH network, or similar, for collecting funds from a demand deposit account (DDA).

In the following descriptive material, the electronic funds instrument according to the present invention is referred to as a "merchant-issued payment" (MIP) card, the electronic funds transaction system of the present invention is referred to as the "merchant-issued payment card network".

The term "interoperable", or "interoperability" of the payment cards described herein is intended to mean the cards can be used across a wide range of retailers, which need no formal association with one another aside from being participants within the merchant-issued cardholder network as issuing merchants, acquiring merchants, or a combination thereof. Furthermore, implementation of the interoperability by the merchant-issued system described does not result from creating any proprietary association or proprietary interconnection of financial transaction systems worked-out between a limited number of retailers.

Purchase transactions are described herein as being executed with the merchant-issued payment card. It should be recognized that the term "purchase transaction" as used herein applies to any purpose for which an electronic monetary transaction is executed, including the purchasing of goods and/or payment for services. These transactions can be executed at either merchant locations (so-called brick and mortar stores), or online retailers.

Although a debit card is generally referred to in the present teachings, it should be appreciated that embodiments of the invention can be configured for use with different forms of payment cards that can be configured to operate over the ACH network. Typically a payment card is backed by an account holding funds belonging to the cardholder, or offering credit to the cardholder. Payment cards can be classified into types depending on how this account is managed. For example, payment cards include credit cards, debit cards, charge cards, stored-value cards, gift cards, electronic purses and so forth. These cards are typically configured with magnetic stripe technology, although smart cards and contactless cards are available. According to an embodiment of the present invention the payment cards, referred to as merchant-issued payment cards, contain ISO identification numbers and are associated with a demand deposit account (DDA) account, while transaction execution is performed through the ACH network for collecting funds. Accordingly, although the cards are referred to in many instances herein as merchant-issued payment cards within transactions over a merchant-issued payment card network, it should be appreciated that the cards need not be debit cards, wherein the term merchant-issued cards may be more applicable while the network can be referred to as a merchant-issued network.

The term DDA refers to a Demand Deposit Account which is an account that allows for withdrawal at any time, the most common among these being a checking account. The term ISO identification number refers to the use of transaction card identifiers by the International Standards Organization (ISO), for example, referring to the ISO 7812 specification.

The terms "merchant" and "retailer", refer interchangeably to a merchant or retailer that has agreed to participate in the program as a card issuer, a card acquirer, or a combination thereof. A cardholder is considered to be a valid holder of a merchant-issued payment card having been qualified by a card issuing merchant, or less typically the merchant-issued payment card network provider, or having alternatively deposited monies in exchange for a given value associated with the card. The terms "merchant" and "retailer" are convenient terms in describing transaction parties. However, it should be appreciated that any business or organization that either posts or executes financial transactions on behalf of a cardholder can be considered a merchant or retailer as those terms are used herein.

All other terms, and abbreviations, comport with those used in the industry which would be readily understood by one of ordinary skill in the art.

The system generally comprises the use of a secure form of interoperable debit card, as issued by merchants to qualifying consumers, which may be utilized by any participating merchants which are connected over a network to card processing services and a merchant-issued card processing computer (or computers), having a merchant-issued payment card database, upon which programming is executed for identifying the cardholder, declining a transaction if the account transaction limits are exceeded, performing positive and negative card checks, settling the transaction through the card processing service from funds within the associated checking account, charging the acquiring merchant a fee for executing the purchase transaction, and in one case remitting a portion of the merchant fee, or providing other remuneration, to the merchant that issued the merchant-issued payment card.

In one embodiment, the point-of-sale transaction, using an ACH based debit card, or similar ACH based payment card, does not go all the way back to the checking account for verification at the time of the transaction, rather it utilizes security features, such as PIN-PAN, daily use and velocity checking, and the checking of positive and negative files to determine if the card and account are valid and in good standing. In the event that a transaction executes and then subsequently is unable to clear (i.e., with or without a float time), such as due to non-sufficient funds (NSF), then a "return item" is generated with associated charges. The merchant-issued payment cards provide for executing an electronic funds transaction in association with the purchase of goods and/or services. Additionally, the merchant-issued payment card may be optionally utilized by a consumer to secure cash back in excess of the sale transaction.

The fee charged to the acquiring merchant can be considered to comprise a transaction fee and an interchange fee. Card usage within the present system is subject to lower transaction fees and interchange fees than typically required with conventional bank originated debit cards. Furthermore, the present invention is preferably configured to distribute a portion of the collected transaction fee, which preferably comprises a portion of the interchange fee, back to the issuing merchant which was responsible for issuing the payment card to the consumer.

By way of example, the merchant-issued payment card system may be implemented such that a ten cent interchange rate applies when a merchant's card is used at another participating retailer. In this example, a portion of the interchange fee, such as six cents, would be returned to the issuing retailer, while the operators of the merchant card debit network would receive four cents. An acquirer paid switch fee may also be charged to the acquiring merchant, such as five cents, to cover the costs associated with network maintenance.

The merchant-issued payment cards contain point-of-sale readable account information, such as within a conventional magnetic strip on the back of the plastic card, or with bar-code on the card, or within an embedded circuit as found on a smart card, or by use of a similar mechanism for retaining machine readable account information. It is preferred that all card numbers begin with the unique ISO identification assigned to the MIP cards.

It will be appreciated by one of ordinary skill in the art that the ISO identification number, and other card aspects, are checked (i.e., mod10 check) within current point-of-sale systems when executing a credit card transaction, however, the ISO is not checked on current PIN based debit cards. Therefore, the new ISO identifier as described for a PIN based merchant-issued card program within the present invention is inherently supported over the existing transaction infrastructure without the need of reprogramming existing point-of-sale transaction equipment.

To the consumer, the merchant-issued payment cards have an appearance and are utilized in the same manner as conventional payment cards, insofar as a given merchant has signed up as an acquirer to accept the cards as payment for goods and services. However, from the standpoint of the merchants, the use of the merchant-issued payment card system can significantly reduce transaction costs while increasing consumer patronage. In contrast to cards issued by banks, the merchant-issued payment cards are issued by participating merchants and are preferably associated with in-house incentive programs.

The qualified consumers receiving a merchant-issued payment card are referred to as cardholders, and they are granted the privilege of executing purchase transactions at participating merchants. The merchant-issued payment cards are preferably issued to consumers that qualify according to a screening process. The merchant may elect to fully or partially perform this account screening process in house, subject to certain restrictions and corresponding to the level of risk being assumed by the merchant. The merchant-issued payment cards may also be co-issued by said merchant in association with one or more guarantor entities which provide a payment guarantee to acquiring merchants on executed transactions in exchange for monetary considerations, such as a percentage of the transaction fee. Transactions are executed based on monetary amounts, and it will be appreciated that any underlying system of monetary value may be utilized, such as dollars, euros, yen, pesos, rubles, and so forth. Typically, the cards are utilized with the prevailing currency standard in the country of use.

Verified information and authorization are provided by the consumer for correctly establishing a path to a store of funds, such as a checking account from which they are authorized to disburse funds. Checking account information, such as account number and routing number as found on a voided check, are provided by the consumer (cardholder) through which payment remuneration is to be withdrawn when a transaction is settled. It will be appreciated that the account must be one from which the consumer is authorized to electronically disburse funds, such as by way of an ACH transaction, stored-value card, and so forth.

It should be appreciated that purchase transactions using the ACH are not checked for an NSF funds condition like a conventional ATM/Debit card, however, they are checked against positive and negative database files to assure the validity of the card and its use. If a NSF conditions does exist at the time of settlement, then the account holder will be liable for the amount of the transaction along with processing and penalty fees generally identical to those for returned checks. ACH transactions are settled against the cardholder's account after the transaction in a similar manner as checks, any settlement delay is referred to as "float". It should be appreciated that conventional debit cards, that are not subject to processing as ACH check transactions, do not have a float period. Therefore, any "float" provided by the MIP card is a benefit for the cardholder, which is in contrast to the immediate settlement of an on-line forms of debit card. Another advantage of the MIP card is that the cardholder may change their checking account to different banks without the need of being issued a new card. The processing fees for electronic transactions using the MIP card provide a substantial savings to the merchants. Furthermore, issuing merchants are provided an incentive for issuing cards, while concomitantly each electronic transaction is guaranteed to the retail acquirer, thereby increasing the attractiveness of debit card use for acquiring merchants. Still further, the MIP card program allows the merchants to receive transaction information associated with the card for use in executing buyer incentive programs and the like. The MIP card may be implemented in a number of forms without departing from the teachings of the present invention.

In an additional embodied version of the card, referred to as a prepaid merchant-issued payment card, the consumer purchases the card for a given amount, or otherwise surrenders a given value, typically monetary, in exchange for the card or extension of credit on an existing prepaid card, and is therefore not required to submit qualifying information. The demand deposit account information, for example account number and routing number, which are associated with a prepaid merchant-issued payment card comprise account information for an account, such as a checking account, or similar, which can be held by the issuing merchant, or a third party associated with the issuing merchant. By way of example, a third party (manufacturer, distributor, franchiser, and so forth) may sell prepaid merchant-issued value cards to merchants for resale to the consumer, or may otherwise have a business relationship with the issuing merchant for providing the cards.

The checking account associated with a prepaid merchant-issued payment card is a checking account held by the issuing merchant, or a third party, as a source of funds to which limited access is provided, such as according to the amount for which the prepaid card was purchased. A prepaid version of the merchant-issued payment card may be issued by a merchant, or a third party establishment, in exchange for receiving monetary compensation, such as from a consumer purchasing the prepaid merchant-issued payment card, or in return for other valuable considerations. It should be appreciated that the prepaid cards may also be issued as incentives, bonuses, and so forth, wherein the issuing merchant, or a third party operating through the issuing merchant, provides cards to consumers based on these other forms of valuable consideration. In one example, the issuer can be compensated by receiving a remuneration (e.g., cash or non-cash), such as based on a portion of the transaction amount, or more preferably the fees charged to the acquiring merchant for executing the transaction within the merchant-issued payment card program.

It will further be appreciated that the monetary value associated with a fixed value merchant-issued payment card can in many cases be recharged upon receipt of additional funds to extend, or refill, the balance contribution associated with the card within the checking account from which funds will be drawn when utilizing the prepaid merchant-issued payment card.

Preferably, the merchant-issued payment cards are branded by the issuing merchant, wherein the face of the card is adapted with an indicia and trade dress associated with the given merchant, or of a third party associated with the merchant, or be co-branded by any number of parties, or any combination thereof. Accordingly, the merchant debit card feature may be incorporated into traditional incentive cards, while new incentive programs may be tied to the issuance of new merchant-issued payment cards as a consequence of the transaction data being made available to the merchant through the merchant-issued payment card payment network.

Although the merchant-issued payment cards are issued by a particular merchant, and may of course be utilized at that establishment, the cards are acceptable for payment by any merchants that have signed on to participate as acquiring merchants in a program associated with the merchant-issued payment card. This interoperability of the merchant-issued payment cards within the present system is a very important aspect of the present invention. This interoperability of the card is automatically attained when a merchant participates in the merchant-issued payment card system as an acquiring merchant. Cardholders of merchant-issued payment cards can thus use their cards without restriction or requalification at any of the participating merchants. For example, when a majority of merchants participate in the program, the merchant-issued payment card thus attains a near universal acceptance across the transaction landscape. It should be appreciated that this interoperability is gained from plan participation and not from interconnection of the proprietary financial systems of a small group of retailers.

It will be noted that retailers today meet with low acceptance levels of "in-house" charge card systems as consumers do not want to carry separate cards, keep current on the legal terms of separate accounts, and receive separate statements for a number of different retailers. Currently, retailers having in-house charge systems can establish financial relationships with one another and integrate and interconnect their individual proprietary financial transaction infrastructures so that a house card at one retailer can be accepted at another retailer, but the process is costly to implement and requires that these retailers maintain a working relationship. Integrating the financial systems requires that proprietary card formats and information known to retailer A are shared with retailer B, and vice-versa, and that the transaction levels be interconnected by a proprietary communication between the disparate transaction execution systems to securely interconnect retailers A and B. Furthermore, aspects of the accounting and transaction cost mechanisms must be worked-out between these two retailers in order to allow use of in-house credit cards at either retailer. It is not surprising that interoperability with house charge card systems has not caught on. In contrast to attempting the use of house cards, the present invention does not require: software changes to the POS systems, transaction routing changes, or settlement changes.

A portion of the interchange fees collected from acquiring merchants when settling fund transactions are optionally disbursed to the issuing merchant of the merchant-issued payment card, while the acquiring merchant is able to process a transaction at a significantly reduced transaction fee. Alternatively, other forms of remuneration can be disbursed to the issuing merchant, or alternatively the consumers associated with the issuing merchant, as an incentive, or in one implementation no direct incentive is provided. It should be appreciated that the present invention contemplates both cash and non-cash incentives. By way of example, the issuing merchant can receive credits toward reducing its own fees, credits for use in its own prepaid merchant-issued payment card program, discounts, services, transaction information access, and so forth. Any rebate provided to the merchants provides a means of further reducing the effective transaction fee borne by the merchants, wherein the profitability of both issuing and acquiring merchants may be enhanced. Furthermore, the use of branded incentivized (also referred to as 'incented') merchant-issued payment cards can increase brand recognition and increase consumer brand loyalty.

The merchant-issued payment cards are preferably configured with one or more security features which prevent parties other than the cardholder from executing transactions with a given merchant-issued payment card. When tendered by a consumer card-holder for making an electronic payment, the merchant-issued payment card (tender) is subject to an approval process during which at least one unique personal identifier associated with the cardholder is preferably utilized to verify cardholder identity. If the merchant-issued payment card is approved over the merchant-issued payment card network, then the associated transaction is routed through a settlement bank, and the transaction is executed. The merchant that issued the specific card from which the transaction was executed optionally receives an incentive, for example a portion of the collected interchange fee, or some other incentive.

The identifier which provides the security feature of the card preferably takes the form of a personal identifier, such as a password or PIN, although other forms of positive identification, such as biometric information (fingerprints, retina scans, voice identification, and so forth) may be alternatively utilized. Preferably, the personal identifier comprises a PIN number that must be correctly entered before approval of the associated electronic funds transaction. It should be appreciated that the use of a PIN for identification allows the merchant-issued payment card to use conventional transaction entry methods, such as terminals, within the existing infrastructure without reprogramming these transaction entry devices to recognize the unique ISO number sequence of the merchant-issued payment card. It should also be noted that a similar mechanism may be adopted with other payment card forms (i.e., biometric identifiers), wherein the merchant-issued payment cards can be accepted across the transaction infrastructure without the need to reprogram or otherwise modify transaction entry equipment By way of example, and not of limitation, a guarantor company may be established as a co-issuer with the merchant to be responsible for transaction approval and providing a guarantee that the merchant receives the debit amount, less transaction related fees, on an approved transaction. It will be appreciated that by combining a unique personal identification, such as a PIN, with a debit card form of financial instrument it becomes a hybrid form of check card product.

According to one implementation of the system, the process of using the merchant-issued card is generally in accord with the following steps. First, the customer arrives at a participating merchant store to purchase goods by executing a transaction at a point of purchase system. Next, the customer, or a merchant employee, inserts the customers MIP card into a point of purchase card reader, or equivalent, after which the customer enters their personal identifier, such as keying in the digits of a PIN, or optionally/alternatively using another form of identification (i.e., biometric). The customer may also elect to receive cash back from their purchase transaction. The cash back option can be allowed by the issuing merchant on some or all of its issued merchant-issued payment cards. The transaction enters the electronic payments processing network and is generally processed by a card processing organization that receives the transaction information and queries a database associated with the merchant-issued payment card program for approval criteria. If the transaction is approved, the merchant receives payment according to the amount of the debit, and is charged a transaction fee and interchange fee. It will be appreciated, therefore, that the use of MIP cards does not burden merchants with the need to purchase additional transaction processing equipment or to retrain employees, or customers to which cards are being issued, on processing or using the MIP cards.

The customer appeal of proprietary "in-house" charge cards, generally offered by large retailer establishments, has been waning. Factors in this decrease may include the large number of retailers patronized by the average consumer coupled with an increasing consumer aversion to carrying a handful of store-specific charge cards, and possibly the prospect of receiving the associated separate billing statements to be processed. In contrast to this, the merchant-issued payment (MIP) card is interoperable across participating merchants, and broadly accepted across the merchant landscape, as it may be accepted by both the issuing merchant and any other merchant that agrees to accept the use of the card, by signing on as an acquiring merchant, or by using a third party card processing service that is configured to process MIP card transactions. In these cases the portion of the interchange fee, or other remuneration, is still preferably directed to the issuing merchant on a transaction using the MIP card. As can be seen, therefore, the invention is a substantial departure from conventional systems employing debit cards in that the merchant is the issuer of an interoperable retailer-branded payment card that utilizes the ACH, or a similar low-cost settlement network for collecting funds, and for which the merchants are subject to a reduced fee structure, sharing of transaction information (i.e., with qualified merchants), incentives (i.e., cash or non-cash) based on card usage, or combinations thereof.

In one implementation of the system, the operators of the merchant-issued payment card network receive a portion of the interchange fee, as well as any optional fees, such as acquirer-paid switch fee, to cover the costs of operating the network and to generate a profit. Alternatively, the costs of operating the merchant-issued payment card system can be borne in other ways, such as through sponsors, or by receiving other forms of valuable considerations in exchange for operating the MIP card network.

Furthermore, it will be appreciated that performing collections on accounts associated with MIP cards can provide an additional profit center for the operator of the MIP card network. These collections are facilitated as consumers must provide address and account information from their checks in order to qualify for the MIP card. In addition, it will be noted that any incentive accrued by a consumer is held, or optionally automatically surrendered, if the MIP card is in arrears or is sent to collections, thus opening up these incentives for use, sale, or redistribution by the operator of the MIP card network.

The merchant-issued payment card program, therefore, differs from conventional charge and debit instrument programs in a number of respects, because the merchant-issued payment card program is designed to be merchant-friendly, and accordingly, the MIP card program and system is configured in a "merchant-centric" manner.

First, the fees associated with purchase transactions, which are paid by the acquiring merchant, are typically reduced. Second, according to one preferred implementation the issuer of the merchant-issued payment card receives an additional incentive (i.e., monetary, or non-monetary) based on the monetary volume of transactions being executed with the given merchant-issued payment card, such as calculated in response to a portion of the interchange fee. Third, the policies governing the operation of the system are configured to aid the merchant in efficiently conducting business, in particular with regards to providing access to consumer transaction information to facilitate the implementation of customer loyalty programs and similar transaction activity related programs. Fourth, the MIP card can be utilized ubiquitously among retailers and other merchants which execute charge and debit card transactions, as it may be accepted by parties other than the issuing merchant. Furthermore, the MIP card program confers ample incentive for merchants to accept the cards for payment, even if they are not in a position to become an issuer of the MIP cards, which should rapidly increase the universal acceptance of the MIP cards.

An object of the invention is to reduce the transaction costs borne by merchants for electronic purchase transactions.

Another object of the invention is to provide a system of interoperable retailer-branded payment cards that utilize ACH, or a similar mechanism, for collecting funds.

Another object of the invention is to include the merchant within the transaction process so that special in-house programs, such as purchasing incentive programs, may be facilitated.

Another object of the invention is to provide a branded merchant debit card that may be utilized at a variety of merchants.

Another object of the invention is to provide a debit card in which issuing merchants optionally receive incentives, such as a portion of the collected interchange fees associated with the amount of card utilization.

Another object of the invention is to provide a debit card in which no point-of-sale bank fees are charged to the consumer.

Another object of the invention is to provide a secure debit card with a unique identification feature, such as a PIN number, which limits fraudulent usage.

Another object of the invention is to provide a debit card in which merchants can elect to partially or fully participate in customer qualification for card issuance.

Another object of the invention is to provide a debit card in which the underlying DDA account can be changed, such as routing and transit information, for a given card without the need of issuing a new card.

Another object of the invention is to provide a merchant-issued payment card system which may be conventionally utilized within the payment card landscape, such as by cardholders at point-of-sale (POS) systems.

Another object of the invention is to provide a merchant-issued payment card system which may utilize existing point-of-sale transaction systems and associated infrastructure.

Another object of the invention is to provide a merchant-issued payment card system which may utilize existing point-of-sale transaction systems which need not be reprogrammed for identifying the merchant-issued payment cards.

Another object of the invention is to provide a merchant-issued payment card system in which the net amounts from ACH settled transactions may be guaranteed to the acquiring merchant.

Another object of the invention is to provide a merchant-issued payment card system that may be deployed across any desired geographic range, such as deployed in a national network.

Another object of the invention is to provide a debit card program that can be easily integrated into merchant-loyalty, frequent-buyer, or other similar merchant programs.

Another object of the invention is to provide a debit card system in which the consumer purchase information is available for the benefit of merchants, such as for adjusting benefit accrual within an incentive-based program.

Another object of the invention is to provide a non-banked version of a merchant-issued payment card which is tied to an amount deposited within the checking account of an issuing merchant, such as a check cashing facility, or third party, wherein even those without checking accounts may purchase a prepaid merchant-issued payment card for their use.

Another object of the invention is to provide for combining multiple payment sources into one card from which funds can be drawn when executing a purchase.

Another object of the invention is to provide a merchant-issued card which can be utilized with a variety of current payment sources such as consumer credit cards.

Another object of the invention is to provide a merchant-issued card which can incorporate multiple tenders of the same or differing characteristics.

Further aspects of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus, system and/or method generally shown in FIG. 1 through FIG. 9. It will be appreciated that the apparatus and system may vary as to configuration and as to details of the components, and that the method may vary as to the specific steps and sequence, without departing from the basic concepts as disclosed herein.

Figure 1:
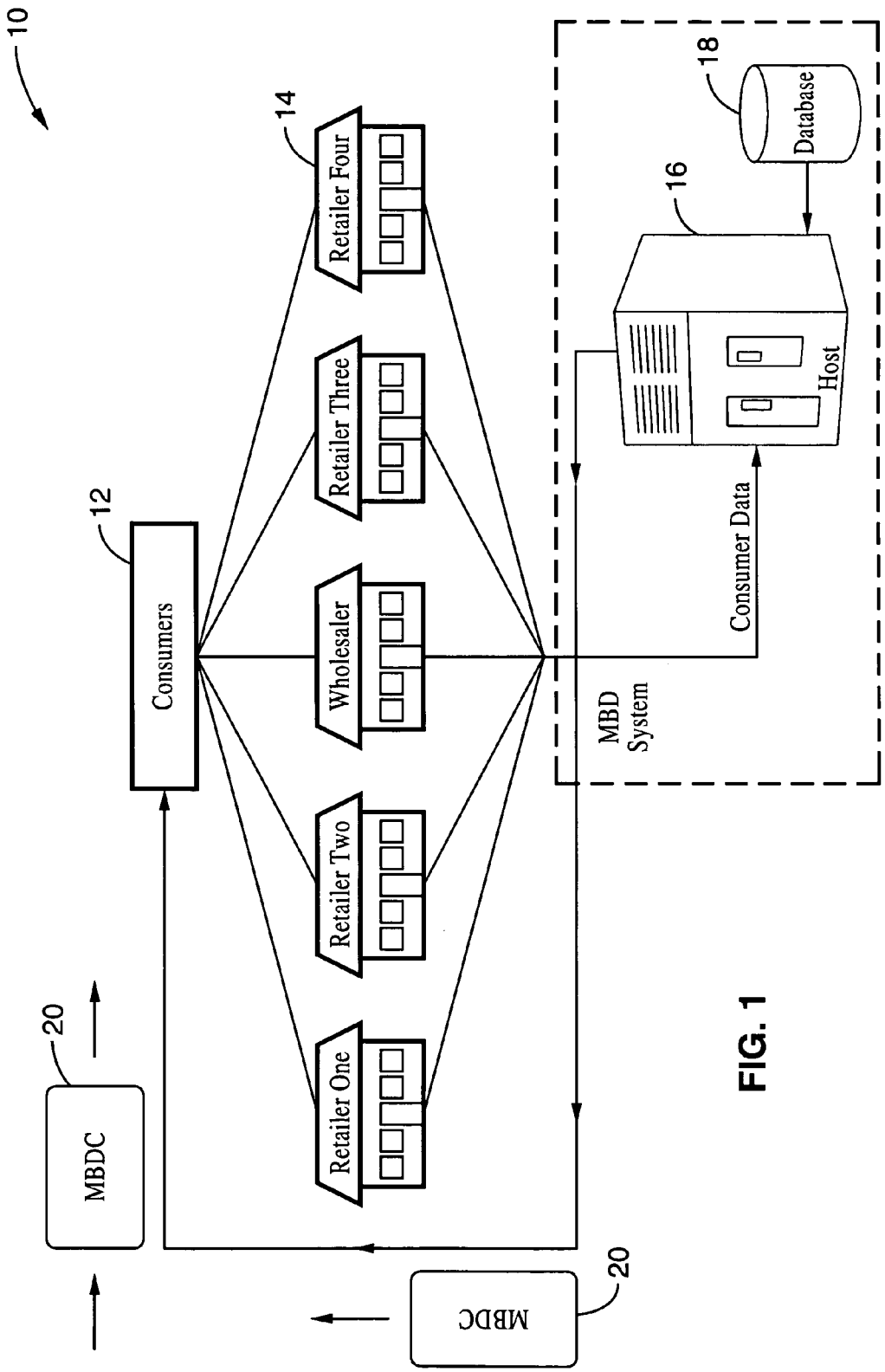
FIG. 1 is a block diagram of the MIP card issuance process according to an aspect of the present invention, shown with MIP cards being issued through a number of merchant, or retailer, entities.

FIG. 1 exemplifies an issuance process 10 for merchant-issued payment (MIP) cards according to an embodiment of the present invention.

The present invention provides a MIP card and an associated network of issuers and acquirers. In the card issuance process, consumers 12 apply for a card at issuing merchants 14. If they are suitably qualified, then consumer information is entered into the merchant system and they are entered as cardholders into the MIP system through MIP card host 16 associated with a database 18 and subsequently issued a merchant-issued payment card 20, such as a secure magnetic striped card that requires the entry of a PIN for use in validating a transaction. It will be appreciated that the application process may be executed using traditional paper-based forms, in-store clerical entry, or consumer "self-serve" sign-up stations (e.g., on-line or kiosk-based) may be provided to readily qualify and sign up new card holders.

Underlying the present network is a set of MIP card operating rules which are considered to articulate the requirements to issue, authorize, and settle debit transactions as set forth by the "merchant-issued payment card network provider", such as a corporation, or other form of governing entity, which typically maintains the cardholder databases and associated databases on a host computer system. Furthermore, a network enabled computer, or computers, are adapted to communicate over the card processing network with card processing services, and merchants. A cardholder database is associated with the computer, or computers, as a repository for cardholder, merchant, and transaction information for identifying cardholders, facilitating the execution of transactions, remitting portions of the interchange fee with issuing merchants, and sharing selected cardholder transaction information (which is in response to the execution of electronic funds transactions using the merchant-issued payment card) with participating merchants, such as for use to implement cardholder incentive programs. Depending on particular implementation, the transaction information can be shared with issuing merchants and acquiring merchants equally, or unequally thus providing an issuer incentive. For example, the issuing merchant can qualify for receiving a higher level of transaction information access than provided to the acquiring merchants, or the transaction information may be shared only with issuing merchants according with another implementation.

Another form of optional incentive is based on interchange fee collection. The merchant-issued payment card network provider collects interchange and other fees and according to one implementation distributes a portion of the interchange fees to merchants (retailers) that have issued the merchant-issued payment cards. The merchant-issued payment card network provider additionally provides (e.g., directly or through third party organizations) adjudication of claims, returns, and other items as provided for in the merchant-issued payment card network operating rules.

Figure 2:
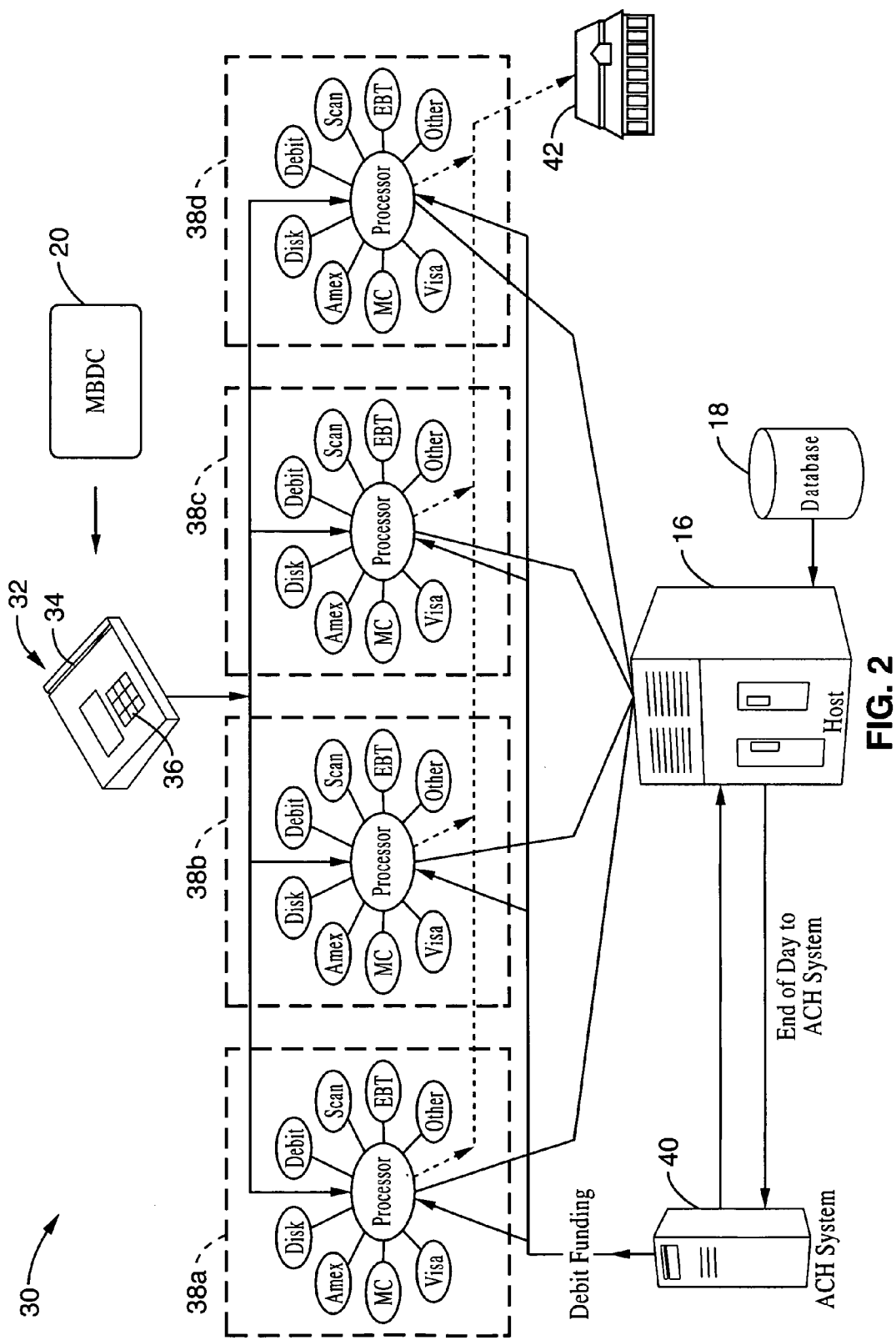
FIG. 2 is a block diagram of funding flow during a POS transaction using a MIP card according to an embodiment of the present invention, shown with a customer MIP card being swiped through a point-of-sale (POS) terminal device during a purchase transaction.

FIG. 2 depicts transaction processing 30 wherein a MIP card 20 is accessed, such as by swiping through a point-of-sale terminal 32 during transaction execution. The MIP card network is preferably designed to include use with existing point-of-sale infrastructure, such as transaction terminals at the point-of-sale. A conventional point-of-sale (POS) terminal 32 is configured for accessing information on the MIP card, such as by means of slot 34 through which card 20 may be slid to allow reading of the magnetic strip, along with an optional identification registration mechanism, for example a set of keys 36 for entering a PIN number and making additional cardholder selections. It will be appreciated that the terminal may be alternatively, or additionally, adapted with one or more identification registration mechanisms, such as biometric sensors for registering fingerprints, retina scans, voice identification, and so forth, without departing from the teachings of the present invention.

The merchant-issued payment card is configured to utilize the same transaction communication path and processing infrastructure that are in place for processing conventional PIN-based on-line debit transactions. The POS terminal 32 is generally connected to third party card processing services 38a-38d, such as EFunds®, BuyPass®, Concord®, PayPoint®, and similar services which execute the transaction in relation with the merchant-issued payment card network host 16 and an associated database 18 which can contain cardholder information, merchant information, transaction information, transaction information access control, issuing merchant tracking for transactions, and other data as required for administering the system. It should be appreciated, however, that a large merchant may elect to provide their own card processing services and be linked directly with MIP card host 16.

The transactions are generally accounted for in the same manner as current on-line debit transactions and are included in the daily and monthly totals for the merchant. The transactions are posted at the end of each day in a batch-mode process at the end of each day, such as through the ACH system 40, which executes a funds transfer from the checking account of the cardholder to the card processing services 38a-38d which then deposit the net monetary amount of the transactions, less transaction and interchange fees, to an account 42 associated with the acquiring merchant.

Figure 3:
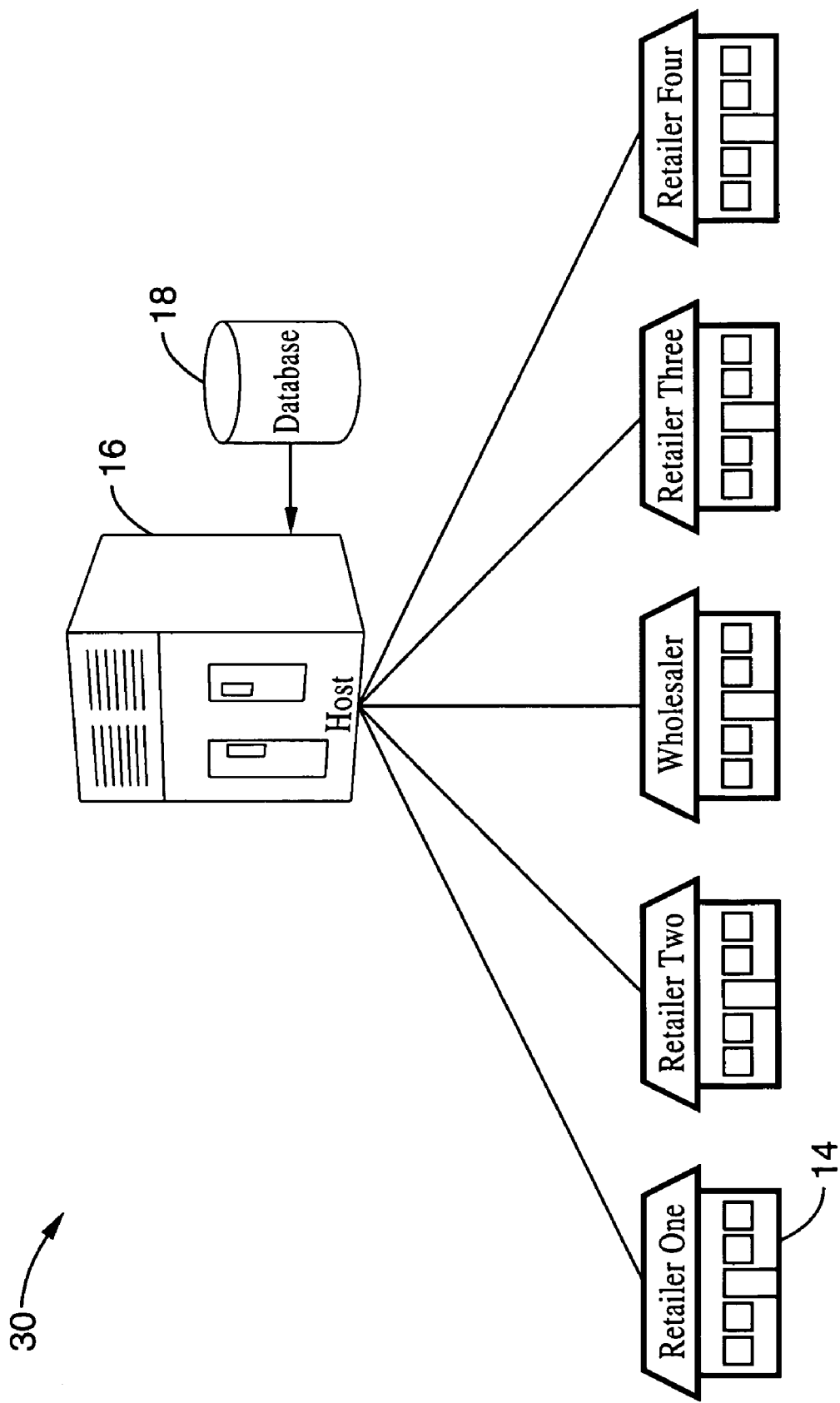
FIG. 3 is a block diagram of interchange fee distribution for the MIP cards according with an aspect of the present invention.

FIG. 3 illustrates remitting of a portion of the fees, such as interchange fees, collected from acquiring merchants to issuing merchants 14, in response to information provided by host 16 in conjunction with database 18. It will be appreciated that each acquired transaction directed at the MIP card is recorded wherefrom a portion of the interchange fees paid by the acquiring merchant may be remitted to the issuing merchant. Making the present merchant debit card system compatible with the current transaction infrastructure eliminates the necessity for investing in additional point-of-sale hardware or the need to train store personnel on utilizing a new transaction process. In addition, the use of a card for executing a transaction is well known and accepted by consumers.

It is envisioned that issuing merchants will primarily comprise multi-location retail businesses. The merchant-issued payment card is expected to be typically distributed as a co-branded card, for instance wherein the card contains the primary identification for the issuing merchant on the front of the card and includes a logo associated with the merchant-issued payment card network on the reverse, or is similarly identified. The debit card is configured with a means for retaining account information, such as a magnetic stripe, and all card identifiers (i.e., card numbers) should begin with the unique ISO identification number assigned to the merchant-issued payment card. The issuing merchant is responsible for compliance to network rules for card issuance and will share in the interchange fees paid for each transaction by the acquiring merchants.

The merchant-issued payment card described herein may be integrated within existing merchant loyalty identification cards, thereby allowing the retailer to utilize existing cards and expand into the use of low-cost MIP card payment functionality with minimal investment. To stimulate usage, the retailer can provide incentives for card usage among their customers. The use of the merchant-issued payment card would have a favorable impact, relative to conventional card usage, on the time necessary to complete the transaction at the point-of-sale and a significant cost reduction to alternative debit and credit card payments.

A merchant may participate in the merchant-issued payment card network as an issuing merchant, an acquiring merchant, or both. Associations or other groups that provide electronic payment services to retailers, such as card processing services, may also participate as issuers of the cards. Merchants may want to participate solely as an acquiring merchant so as to benefit from the advantages of the system, for example to enjoy a reduced cost per transaction in relation to conventional electronic payment transactions. Merchants may desire to participate to a further degree and gain additional benefits by becoming both an acquiring merchant and an issuing merchant to gain benefits from both the reduced transaction costs accorded to the acquiring merchant and the interchange fee revenue which accrues to the issuing merchant.

A merchant joining the merchant-issued payment card network contractually agrees to abide by the operating rules and regulations as stated in the associated network operating rules, and further agrees to abide by the rules and regulations applicable to POS ACH debit, regulation E of the Federal Code and other laws incorporated into and a part of the merchant-issued payment card network operating rules.

The merchant-issued payment card network provider maintains a host data center, which includes the necessary databases required to provide account screening for card issuance, card database management, payment processing including authorization, financial settlement and reconciliation, returns management and collection. The merchant-issued payment card network provider preferably offers additional services to affiliated acquiring merchants, and issuing merchants, such as guaranteed payments and services associated with the collection of returns.

Figure 4:
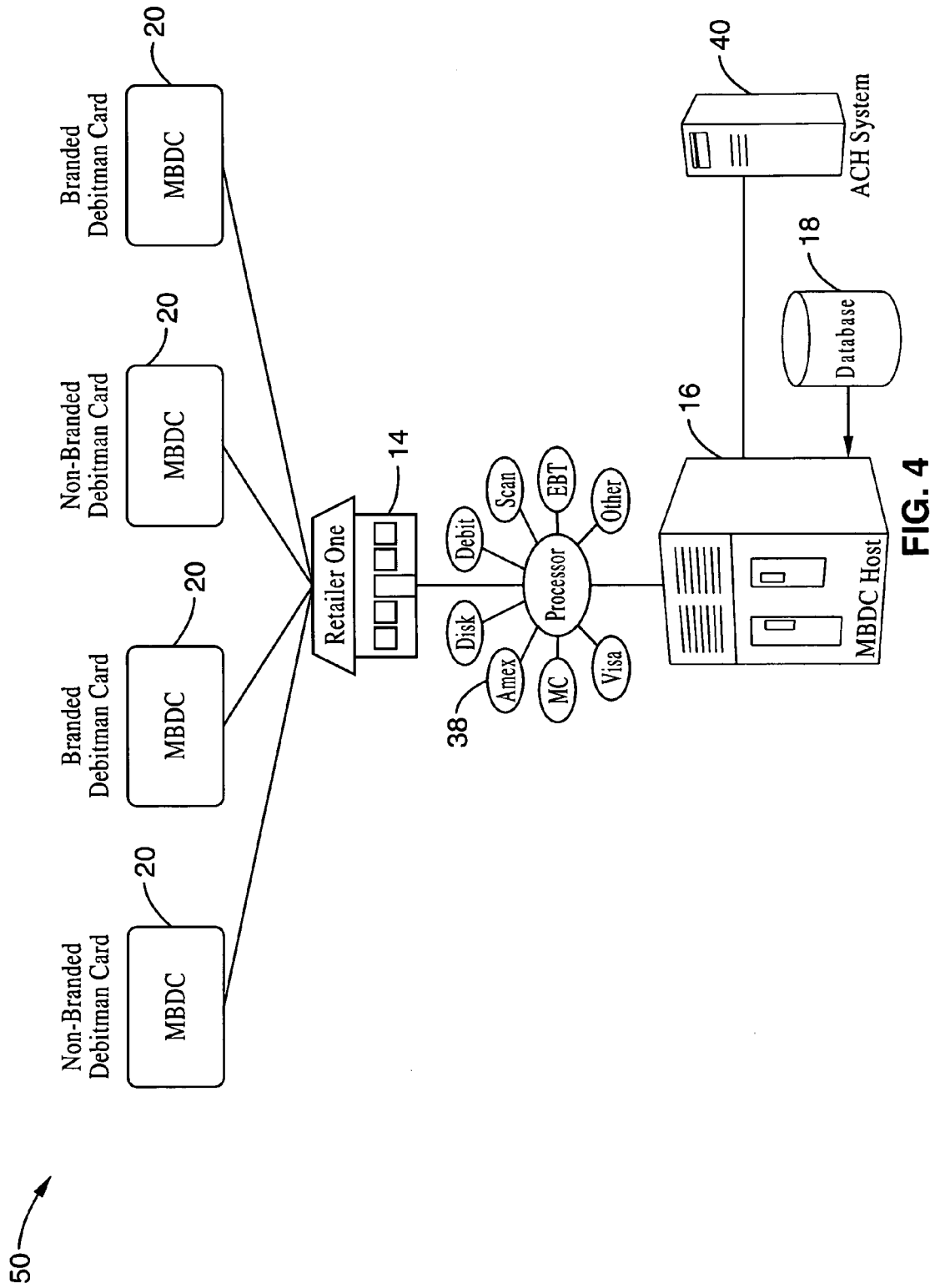
FIG. 4 is a block diagram of branded and non-branded MIP cards being used to execute transactions according to an aspect of the present invention in which MIP cards are purchased with an established dollar transaction limit.

FIG. 4 illustrates the use of prepaid merchant-issued payment cards for use in a "non-banked" application 50, wherein the debit cards are issued for an associated monetary amount, such as deposited with a merchant, or similar establishment. It will be appreciated that the cards may be issued as branded cards containing merchant-specific trade dress, or alternatively containing third party trade dress, indicias, and so forth, or displaying images, graphics, text, and so forth which are not substantially directed toward the issuing merchant or other merchant companies. The use of branded cards having appropriate indicias and trade dress provides beneficial advertising while enhancing the recognition of the merchant in the marketplace.

A prepaid fund form of the MIP card is exemplified in this figure which operates somewhat differently than the debit card described previously, wherein funds were drawn from a consumer checking account. Prepaid merchant-issued payment cards will preferably be made available for purchase by consumers at participating merchants. These prepaid cards may be marketed to consumers that lack a checking account, or that otherwise desire limiting their exposure to monetary risk from a lost or stolen card. These debit cards may also form a merchant-to-merchant form of gift card, allowing a consumer to utilize the value of the card at a number of participating merchants. The prepaid cards are particularly well-suited for sale by check-cashing establishments and similar venues whose patrons may not qualify for, or otherwise be in possession of a checking account.

Referring to the figure, the prepaid (MIP) merchant-issued payment cards 20 may appear as conventional branded, or non-branded, debit cards. Consumers purchase these prepaid merchant-issued payment cards from merchants 14 that elect to sell the prepaid debit cards having a preprogrammed or merchant programmed card value. The cash value of the card is then associated with a checking account of the merchant, or alternately a guarantor or a third party entity, wherein executing a transaction with the card results in deducting a given cash amount from the associated merchant checking account, or alternately the guarantor or third party entity. A prepaid card that is preprogrammed is typically sold in fixed monetary values, for example $20, $25, $50, $100, $200, $500 and so forth. A card that is programmed by the merchant can be configured for any desired level of associated monetary value.

A prepaid version of the MIP card is processed in a similar manner as the regular non-prepaid card, wherein the MIP card 20 is swiped at a point-of-sale terminal at merchant 14, which communicates with a card processing service 38 that accepts that type of card and it communicates with the merchant-issued payment card host 16 with associated database 18 for validating identification and executing a transaction, such as through ACH system 40. It will be appreciated that the data fields describing a prepaid MIP card within database 18 may differ from those for a non-prepaid card. In particular, the amount that a particular prepaid MIP card is programmed for may be optionally included in the database, wherein a further check on remaining monetary value prior to a transaction may be carried out. Funds are drawn (ACH) from merchant checking accounts associated with funds by which the non-banked debit cards are purchased, which is contrasted to banked debit cards in which the funds are drawn (ACH) from the checking account of the consumer. The operation of both forms of merchant-issued payment card (prepaid funds and consumer charged funds) are substantially similar.

Figure 5:
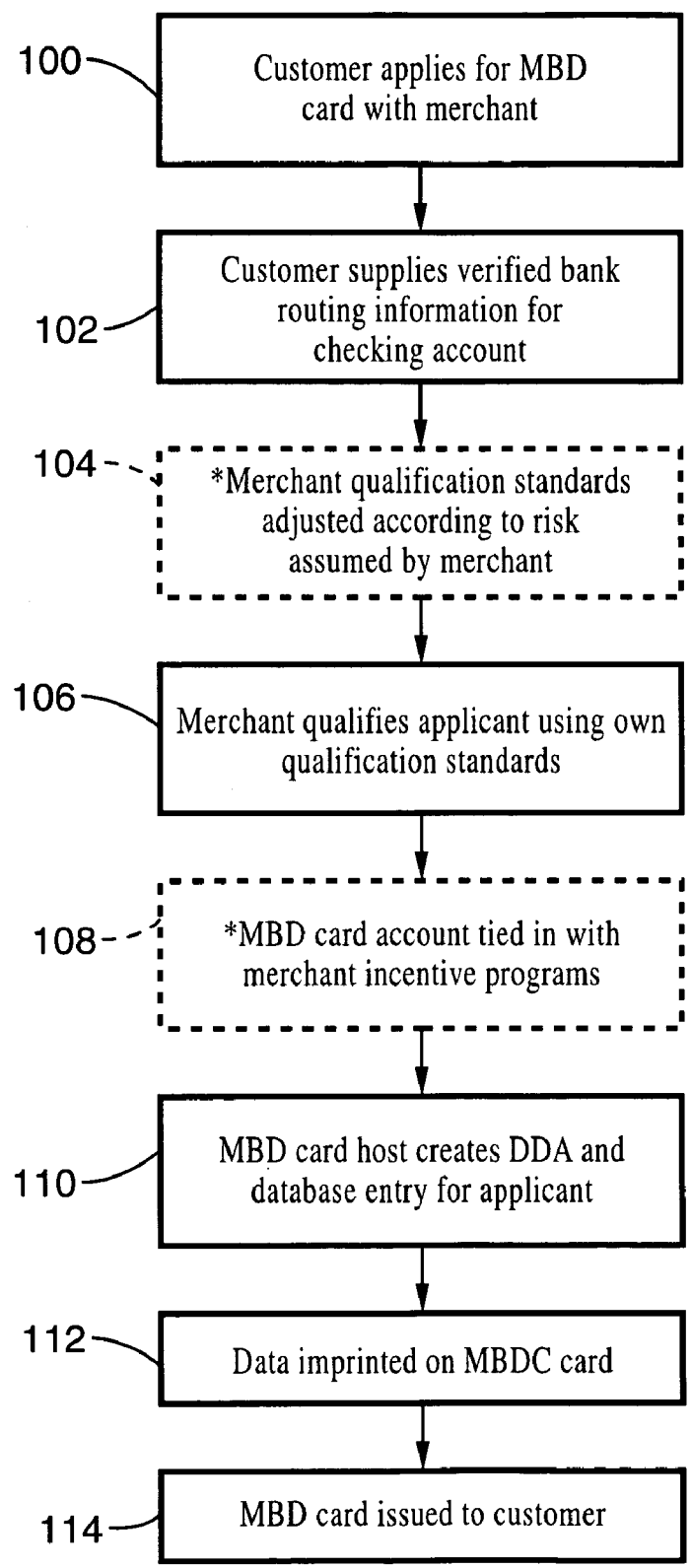
FIG. 5 is a flowchart of the issuance of a MIP card according to an embodiment of the present invention.

FIG. 5 illustrates the general process of issuing a (non-prepaid) merchant-issued payment card wherein funds are withdrawn from an associated cardholder account according to the execution of a purchase transaction. A consumer applies for the merchant-issued payment (MIP) card through an issuing merchant as represented by block 100. The consumer supplies information as per block 102 to allow disbursing funds from their checking account. The charge information preferably includes checking account number and bank routing information (preferably verified by a voided check), and other information, including address, which is deemed necessary for facilitating the collection of funds and item returns. The application preferably also authorizes the merchant-issued payment card network provider to represent and collect any returned items electronically including any fees for NSF (non-sufficient funds) as allowed by law.

Participating issuing merchants provide an electronic file to the merchant-issued payment card network provider for use in populating the host database for the given merchant. The network structure preferably includes remote entry and transaction information control fields to allow issuing merchants to update their associated information and gather transaction information about their cardholders within the host file on a real-time basis, such as for the purpose of adding consumers or updating information including changing a PIN or DDA number within an account, and so forth. The merchant-issued payment card network provider preferably utilizes an internet-based application process to facilitate activation of new cardholders and to minimize the costs associated with cardholder set-up.

An initial screening process is utilized by the merchants to qualify consumers to become cardholders. The qualification process determines the credit worthiness of the applicant in terms of the guidelines established from the merchant-issued payment card network provider. However, the issuing merchant can establish their own qualification procedure as represented by optional block 104, subject to merchant-issued payment card network operating rules and the assumption of additional risk as warranted. The merchant-issued payment card network provider may assume any selected level of risk and guarantee authorized transactions at its discretion according to the form of contract with the merchant and any associated third party organizations. The criteria for initial screening and the proportional sharing of interchange fees will typically dictate this decision. The merchant qualifies the prospective cardholder to receive a merchant-issued payment card according to their agreement with the merchant-issued payment card network, as shown in block 106. The merchant may optionally tie the issuance of the MIP card with merchant incentive based programs as reflected by block 108, wherein for example consumers earn considerations for using the MIP card for making purchases at the merchant location and other locations accepting the MIP card.

The programming of the host computer of the merchant-issued payment card network preferably validates the DDA through a pre-note process for a given applicant to ensure that the path to the checking account of the consumer is correctly established, as depicted by block 110. The consumer information, along with any necessary security feature information is then imprinted and encoded into the merchant-issued payment card in block 112 and issued to the consumer at block 114.

The issuing merchants would typically manage the handling of lost and stolen cards themselves, albeit with initial information and support from the merchant-issued payment card network provider. At least one of the MIP card embodiments cannot be utilized without a corresponding personal identifier, such as a PIN, wherein the liability for unauthorized use of lost or stolen cards should be minimal. Replacement of lost and stolen cards is generally envisioned to be a responsibility of the issuing merchant.

Figure 6:
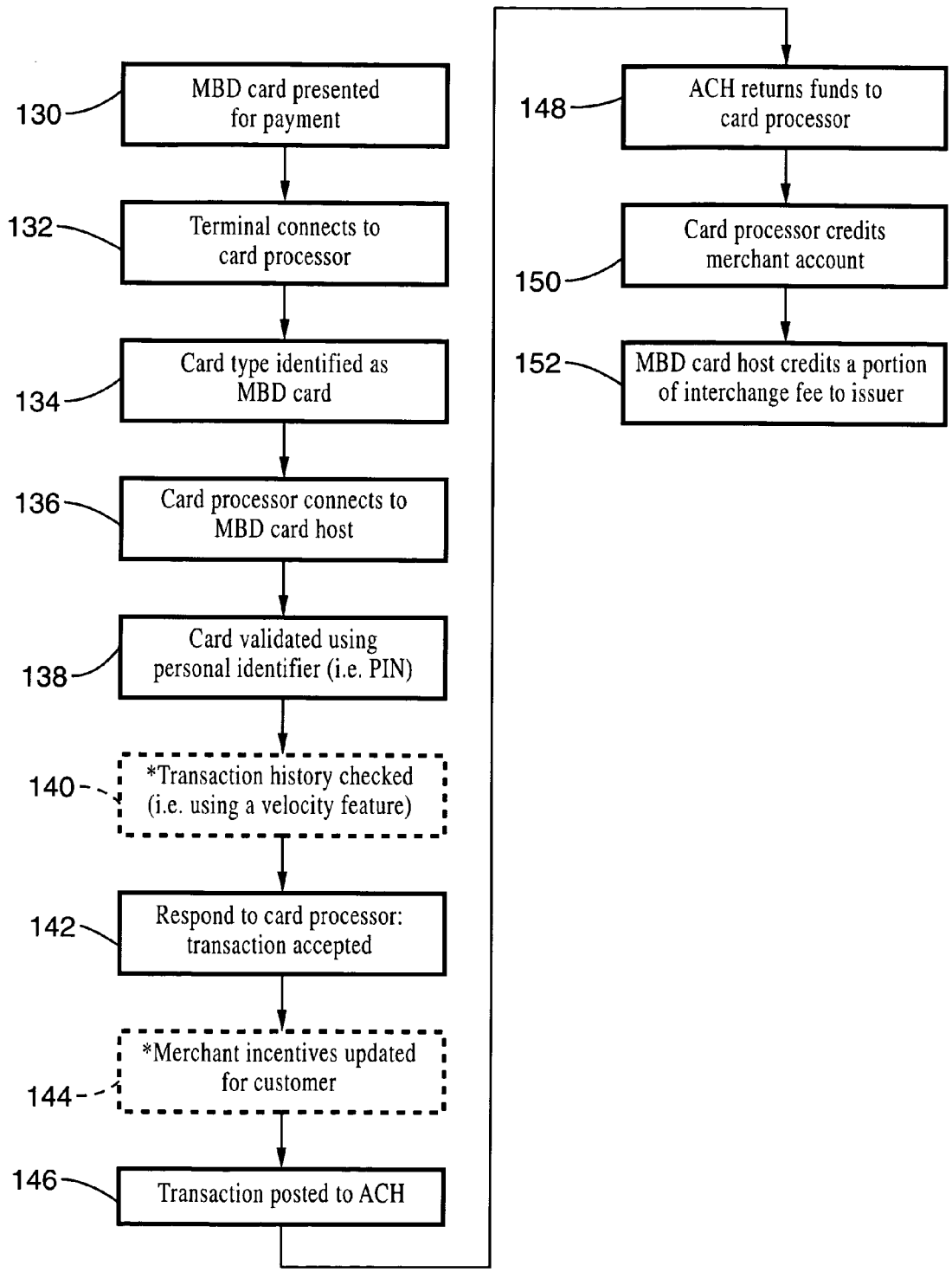
FIG. 6 is a flowchart of transaction processing for an MIP card according to an aspect of the present invention.

FIG. 6 depicts the flow of transaction processing, wherein the merchant-issued payment (MIP) card may be presented at block 130 as a means of payment by the consumer at any authorized acquiring merchant and is read by an associated terminal at block 132, the card type is identified as a MIP card in the transaction network as per block 134. The merchant POS system routes the transaction message, such as including PAN, PIN; and Amount, directly to the merchant-issued payment card network host computer as represented by block 136, or through a third party processor that has been certified for accessing the merchant-issued payment card network host.

The transaction message is generally communicated through any number of communication links, typically telecommunication links, from third party processors or directly from an acquiring merchant. Once the transaction message is received by the merchant-issued payment card network host, a series of validation routines are performed, as represented by block 138. The first activity verifies that the personal identifier matches that on file for the cardholder. For example, the PIN must match the PAN as recorded in the database. If a match does not occur, a declined message is returned to the point-of-sale terminal. The issuing merchant will determine the extent of the next series of validations and define specific parameters. Attempted transactions are preferably evaluated according to transaction limits, also referred to as card usage limits, associated with a specific merchant-issued payment card. The transaction limits may comprise either a monetary limit for a single transaction, a limit on the rate of monetary transactions, or may utilize combinations thereof. Preferably, other forms of verification are performed such as checking a database of historical information, generally referred to as a positive file which indicates accounts which are active and valid, and negative files which contain information on accounts that are invalid, or otherwise unacceptable, such as those accounts associated with a stolen or lost card, fraud, and so forth. A number of firms offer positive and negative file database services including SCAN® and TeleCheck® to stop losses associated with bad checks, or in this case ACH based debit card transactions.

Validation according to optional sets of limits, such as a variable velocity feature may also be performed within the present system as shown in optional block 140. A time sensitive usage value, such as variable velocity, can be used to evaluate allowable card use according to one or more time sensitive usage values. In particular, a typical variable velocity implementation validates a transaction subject to a set of parameters such as the amount of the transaction, daily frequency of card use, and optional additional time sensitive values. Another series of validations determined by the issuing merchant include both positive and negative files that serve to reduce the risk of a returned item. If the merchant-issued payment card network cardholder currently has an outstanding returned item, the transaction request is declined until the issuing merchant reinstates the cardholder. Once the validations are completed, a return message authorizing the transaction is sent to the point-of-sale terminal as represented by block 142.

The information from the transaction may be optionally utilized for updating information relating to merchant incentive programs, represented by block 144, which are associated with the transaction.

The approved transaction is matched to the DDA information, which comprises routing and transit number in the database file, and an automated clearing house (ACH) record is created. All transactions processed in the business day are consolidated in a batch file and delivered to the ACH for settlement as shown by block 146, by way of a designated originating depository financial institution (ODFI). Each transaction record preferably includes sufficient information to identify the place and time the transaction occurred to facilitate the inclusion of this information in the consumer's bank statement. The merchant-issued payment card network provider is preferably configured for settling transactions in a periodic batch mode, such as may occur daily, wherein funds may be returned to the third party card processor and issuing merchants, as represented by block 148, while credits are thereafter credited to the merchant account as represented by block 150. It will be appreciated that ACH processing can be subject to "float", such as 1-3 days, from the execution of the electronic transaction and settlement with the associated checking account. The MIP host thereafter preferably credits a portion of the fee charged for the transaction, such as a portion of the interchange fee, to the issuing merchant as per block 152.

Transactions returned for non-sufficient funds (NSF) are preferably represented electronically up to two times depending on the policy of the issuing merchant. If the merchant-issued payment card network provider has guaranteed the transaction to the issuing merchant and acquiring merchant, the transaction is represented twice along with the returned item fee authorized by the cardholder. If the item fails to clear, a collection process will commence. The card will typically be shut down immediately by the MIP card network if a collection problem arises, such that no additional debt is incurred. The account holder is liable for the amount of the transaction in addition to fees for a returned check transaction, and any associated bank fees. If the card issuer is responsible for the returned item, the MIP card network provider is capable of representing the item electronically based on the guidance and policy of the issuing merchant and delivers the information related to unsuccessful collections to the issuing merchant and the item is charged back to the account of the issuing merchant. The processing of ACH administrative returns is preferably handled by administrative personnel associated with the merchant-issued payment card network provider, which may include daily database updates on required changes.

It is envisioned that merchants desiring to lower their cost per electronic payment transaction will sign on as acquiring merchants to accept the merchant-issued payment card. Once established in the network, an acquiring merchant gains the ability to execute transactions in the same manner as on-line PIN debit transactions, wherein the processing, settlement, and reporting functions as seen by the acquiring merchant are identical, albeit more merchant-friendly. An acquiring merchant of course is required to comply with the merchant-issued payment card network operating rules and to pay interchange and transaction fees associated with card processing, whether by a third party or performed in house.

A card processor which receives transaction information associated with a MIP transaction is required to connect to the merchant-issued payment card network host, which is governed by a network interface specification that governs the technical connection requirements. Connection certification is typically to be required prior to transaction processing, and the operating rules govern the ongoing processing activity. The interchange fees and other processing fees are generally to be collected and settled daily with the merchant-issued payment card network host.

It will be appreciated that many aspects of the MIP card are applicable to implementation of a variety of additional and alternative card forms, without departing from the teachings of the present invention as claimed. Market acceptance, card usage, and growth may dictate the number and variety of MIP card variants which are offered. One such variant was already described in a prepaid MIP card, although additional cards such as gift cards, purchase cards, and others associated with the MIP system may be implemented subsequently.

Figure 7:
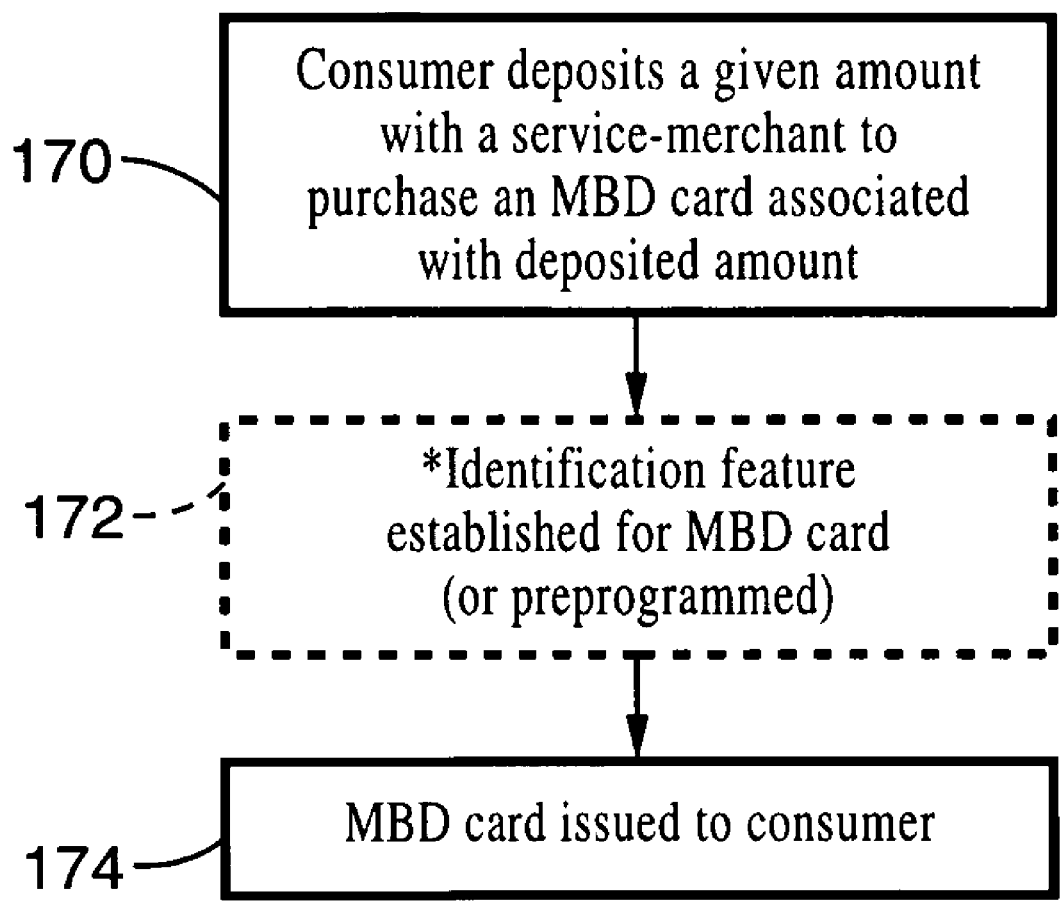
FIG. 7 is a flowchart of the issuance of a preprogrammed prepaid value non-banked MIP card according to an aspect of the present invention.

FIG. 7 represents the basic card issuance process for the prepaid version of the MIP card, wherein the consumer purchases the card for a given amount, or otherwise provides remuneration in associated with the receipt of a card or credit balance increase. As the consumer has tendered monies (or a monetary equivalent thereof) for a certain value of card use up-front they are not required to submit qualifying information. It will be noted that the checking account number and routing number are associated with a prepaid merchant-issued payment card comprising account information for a checking account which is held by the issuing merchant, or a third party providing services to the merchant, that is responsible for issuing these prepaid fixed value cards.

The consumer "deposits" a given amount with a service merchant as represented by block 170, although typically this transaction would be considered a purchase transaction wherein the user is purchasing a new card (fixed value or loadable value) or is applying funds to increase the balance of an existing prepaid MIP card. Preferably, an optional identification feature is established for the MIP card as depicted by block 172, such as a PIN or other personal identification means, so that card usage is cardholder specific. It will be appreciated that the prepaid cards may be provided without identification means, according to the dictates of card value and card application. In one aspect of the present system, the card purchaser is optionally allowed to choose whether the identification feature is included in the prepaid card. The prepaid MIP card is then issued to the consumer, as represented in block 174, and may be utilized as described previously for MIP cards that are not prepaid, however, operation of any optional incentive programs could be absent, or otherwise differentiated, when purchases are made utilizing the prepaid MIP card.

Figure 8:
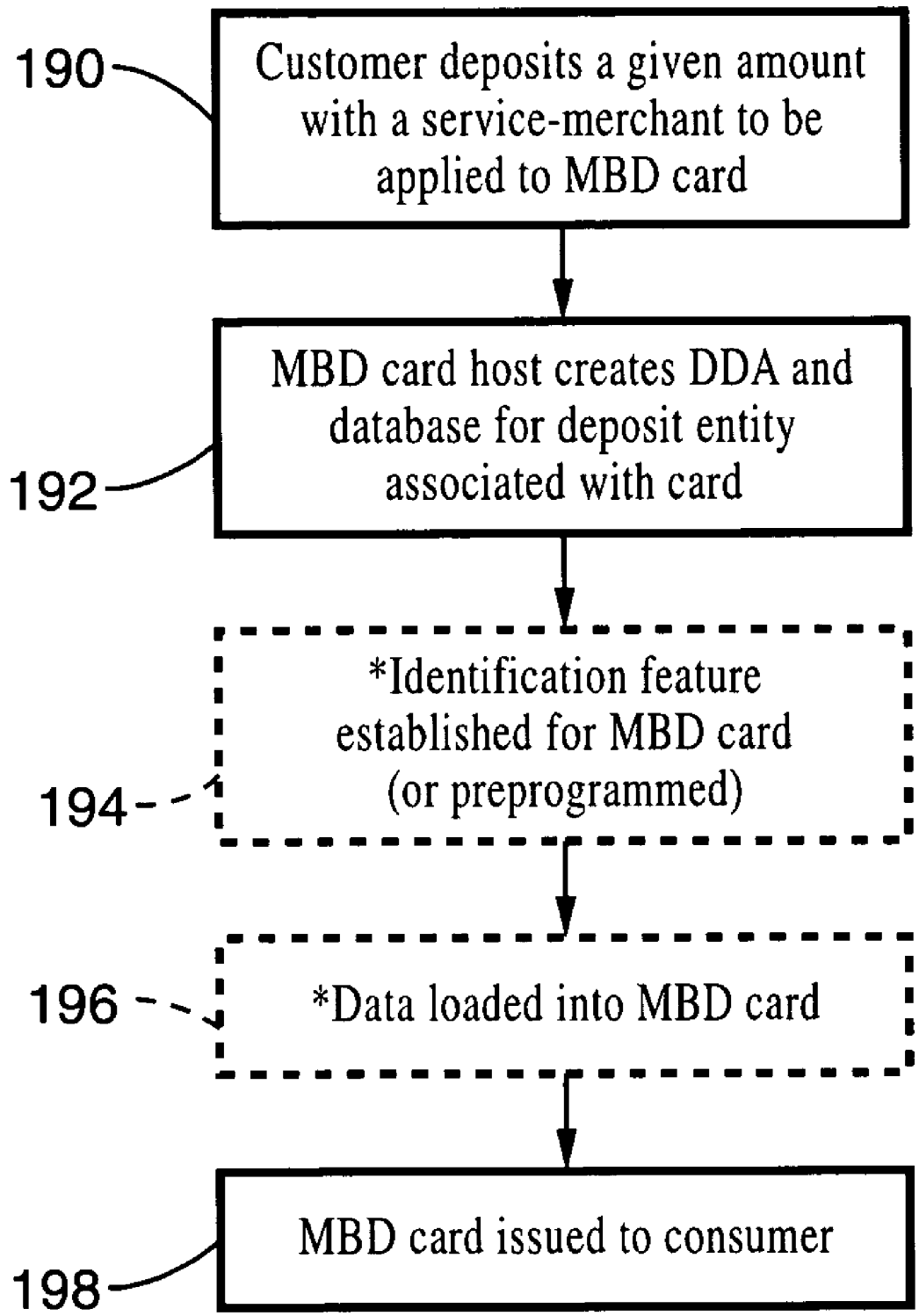
FIG. 8 is a flowchart of a merchant programmed prepaid value non-banked MIP card according to an aspect of the present invention.

FIG. 8 depicts merchant programming of a prepaid value "non-banked" MIP card in response to receipt of monies, shown in block 190, such as a deposit or purchase transaction, from a customer which is to be applied to the card value. The MIP card host creates the appropriate DDA entries in block 192 for the checking account associated with the card, which is typically the party receiving the deposit, either directly or indirectly, which includes third party card merchants and so forth. The card may optionally be configured with an identification feature as per block 194, either which is established for the card or preprogrammed for the given card. Data may then be optionally loaded to the MIP card as per block 196, or to the associated issuing merchant database, arid the card issued as represented by block 198 to the consumer.

Figure 9:
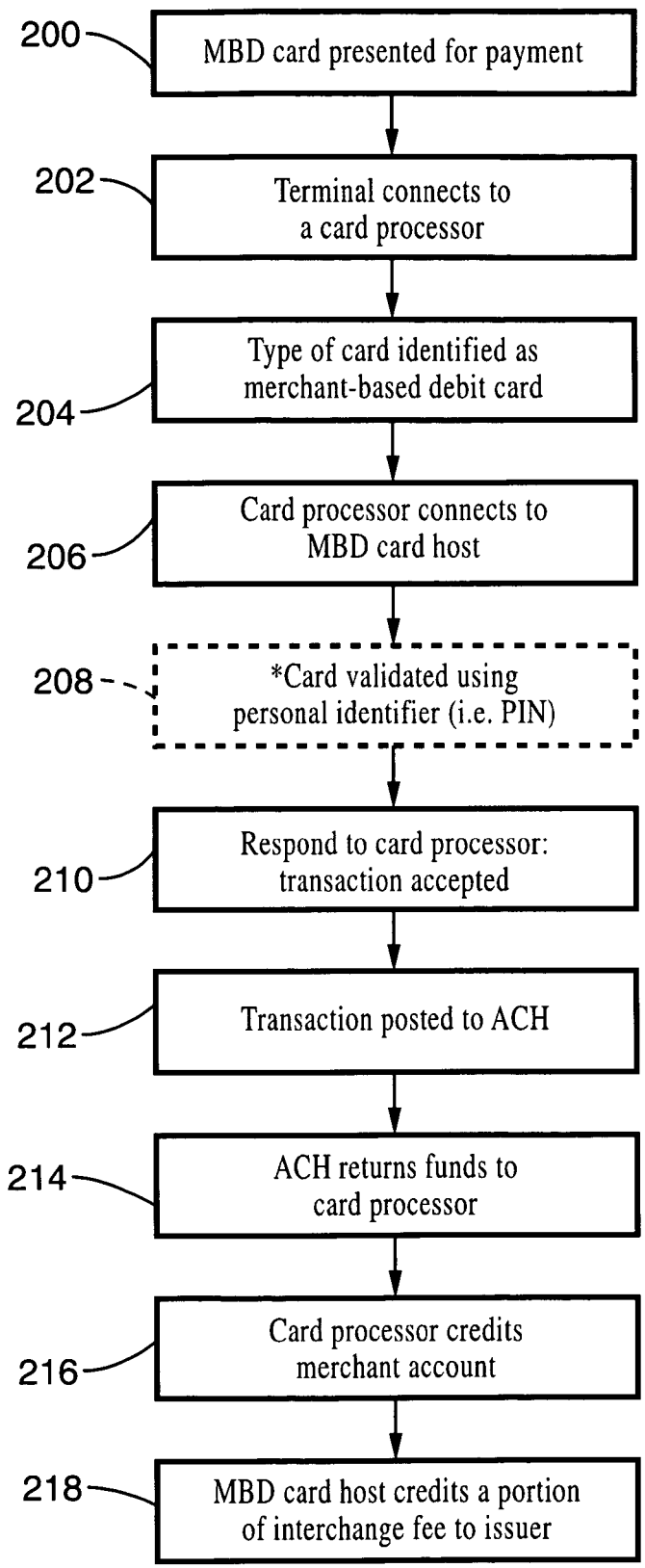
FIG. 9 is a flowchart of transaction processing utilizing a prepaid value non-banked MIP card according to an aspect of the present invention.

FIG. 9 represents the use of a prepaid MIP card by a consumer. The card is presented for payment at block 200 by the consumer is read by a transaction terminal that connects to a card processor at block 202, wherein card type, MIP, is identified at block 204. The card processing entity connects to the associated MIP card host at block 206, and the card is preferably validated at block 208 if optional identification features have been defined for the issued card, whereby the transaction may be accepted as per block 210. It will be appreciated that due to the anonymity with which prepaid cards may be purchased, a remaining monetary balance may be optionally retained for each such card within the MIP host system as additional security to thwart attempts at altering or circumventing the value for which the card was purchased. At some point subsequent to transaction execution, the transaction is posted to ACH at block 212, which returns funds to the card processor as per block 214, the card processor credits the associated merchant account 216, and a portion of the transaction fee collected is credited to the issuing merchant as shown by block 218. The portion of the fee credited to the issuing merchant is shown being preferably a portion of the interchange fee.

It is contemplated that a third party (manufacturer, distributor, franchiser, and so forth) may sell prepaid merchant-issued value cards to merchants for resale to the consumer. The checking account associated with a prepaid merchant-issued payment card is a checking account held by the issuing merchant, or a third party, as a source of funds to which limited access is provided, such as according to the amount for which the prepaid card was purchased.

The payment source according to one MIP card embodiment can be from sources other than a DDA or prepaid element, or it may be from a combination of sources. By way of example, the card can be tied to a money-market account, stored value amount, or credit card. In one variation, multiple sources are available, such as drawing from a DDA account or prepaid account to the extent that funds are available and then drawing any remaining level of funds required to execute the transaction from an associated charge account. In one variation, the MIP card is adapted with multiple fund sources to which the user can gain access, for example in response to the use of different PIN-PAN codes. In this case the user enters a PIN code for the account and the software matches this with a PAN associated with the desired payment source account for use in that transaction, such as accounts defined by the user.

In a similar manner the MIP card can be configured to provide multiple tenders, for example providing the ability to execute transactions spread across multiple transaction instruments of the same, or different form, such as according to prepaid, debit, and credit instruments, or any combination thereof. Transaction execution utilizing any of these tenders, or a combination thereof, can be preferably executed on demand by the consumer, or other selection criterion.

Accordingly, it will be seen that this invention provides a method and system whereby merchants can support electronic transactions executed by consumers without the attendant high transaction costs associated with traditional charge and debit card use. Embodiments of the invention describe providing incentives for issuing merchants wherein they receive a portion of the interchange fee collected for each transaction executed using a given merchant-issued payment card, or some alternate form of incentive based on transaction volume with a card they have issued. It will be appreciated, however, that the fee structure described may be varied without departing from the present invention. By way of example and not limitation, the fee structure can include: (1) distributing portions of the collected fees (i.e., as percentages) back to issuing and/or acquiring merchant; (2) returning monies to either merchant party (e.g., issuing merchant or acquiring merchant) which are not associated with collection of the interchange fee; (3) distributing consumer use incentives (i.e., automatically), such as when consumers use the MIP card at an issuing merchant; and similar further variations and combinations which may be implemented by one of ordinary skill in the art without inventive creation. The present system also preferably aids merchants by sharing transaction information with the merchants to facilitate consumer incentive and loyalty programs by the merchant. In addition, the merchants can establish their own set of consumer qualification criterion whose standards are commensurate with the level of fiscal responsibility accepted by the merchant. One or more security features, such as a PIN number, are preferably required when utilizing the merchant-issued payment cards to mitigate fraudulent use. The system of the present invention may be implemented in a number of ways within the transaction infrastructure without departing from the teachings of the present invention.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for facilitating electronic funds transactions using interoperable payment cards between one or more cardholders and one or more merchants, the system comprising:

one or more payment cards containing point-of-sale readable account information, configured to be issued to the one or more cardholders within a merchant-issued card program;

wherein said one or more payment cards are associated with one or more respective account numbers that begin with unique International Standards Organization (ISO) identification number, which are assigned for the merchant-issued card program;

wherein said one or more payment cards are configured to be issued by the one or more merchants, participating in said merchant-issued card program as one or more issuing merchants, to the one or more cardholders with privileges to execute purchase transactions interoperably at any of the one or more merchants;

one or more point-of-sale transaction terminals respectively associated with at least some of said one or more merchants, acting as acquiring merchants, and configured to interoperably receive said payment card as a form of payment, without interconnecting their respective proprietary transaction execution systems;

a network-enabled computer having an associated payment card data base within the merchant-issued card program and adapted for communicating through non-proprietary card processing services with the one or more point-of-sale transaction terminals;

wherein said payment card data base is configured to be loaded with information for accessing one or more respective valid demand deposit accounts (DDAs) associated with the account numbers before said one or more payment cards will be accepted for payment at the one or more point-of-sale transaction terminals; and programming associated with said computer, wherein said programming configures the computer to:

receive respective transaction information from the one or more point-of-sale transaction terminals in response to an attempted purchase transactions by said one or more cardholders using said respective payment cards, execute one or more of said purchase transactions utilizing an automated clearing house (ACH) network in response to respective DDA information retained for said payment cards, in response to determining that the payment cards and purchase transactions are valid, settle one or more of the purchase transactions after execution of said one or more purchase transactions, through a card processing service, from funds retained within one or more DDAs associated with one or more of the respective payment cards associated with the one or more purchase transactions, charge one or more acquiring merchants a fee for executing said one or more purchase transactions, and provide incentives to the one or more issuing merchants who issued the one or more payment cards involved in respective purchase transactions in response to settling the respective purchase transactions.

2. A system as recited in claim 1, wherein said programming configures the computer to provide to the one or more issuing merchants with cash or non-cash incentives.

3. A system as recited in claim 1, wherein said payment cards are branded by one or more of said merchants, one or more parties associated with one or more of said merchants, or a combination of one or more merchants and one or more associated parties; and wherein said branding comprises an indicia and trade dress to advertise and enhance recognition of said merchant, and/or parties, in a marketplace.

4. A system as recited in claim 1, wherein said network-enabled computer is configured to enable the issuing merchants to qualify one or more cardholders to whom they issue payment cards and to assume at least a portion of the responsibility for transactions of the one or more cardholders qualified by the issuing merchants.

5. A system as recited in claim 1, wherein at least one of said payment cards is co-issued by an issuing merchant and a guarantor entity; wherein said guarantor entity provides a guarantee to acquiring merchants as to the payment of executed transactions; and wherein said guarantee is made to said issuing merchant by said guarantor in exchange for monetary considerations thereof.

6. A system as recited in claim 1, wherein said programming further configures the network-enabled computer to validate a respective payment card in response to receiving a personal identification number (PIN) before executing one or more respective purchase transactions based on the respective payment card.

7. A system as recited in claim 1, wherein said programming further configures the network-enabled computer to enable the issuing merchants to control issuance of payment cards from which transactions can be executed at merchants that have signed up in the merchant-issued card program as acquiring merchants.

8. A system as recited in claim 1, wherein said programming further configures the network-enabled computer to share transaction information with said issuing merchants and/or said acquiring merchants; and wherein said issuing merchant qualifies to receive higher levels of transaction information access as a form of incentive issuing merchant incentive.

9. A system as recited in claim 1, wherein said programming further configures the network-enabled computer to evaluate requested purchase transactions in relation to predetermined account limitations prior to executing said purchase transactions.

10. A system as recited in claim 9, wherein said programming further configures the network-enabled computer to evaluate requested purchase transactions in relation to transaction limits, rate of use limitations, or a combination thereof.

11. A system as recited in claim 9, wherein said programming further configures the network-enabled computer to evaluate requested purchase transactions in relation to a variable velocity feature which evaluates valid card use according to one or more time sensitive usage values.

12. A system as recited in claim 1, wherein said programming further configures the network-enabled computer to request card processing services to be performed by a third party processor or by a merchant which provides its own card processing services and is linked directly to the network-enabled computer of the merchant-issued card program.

13. A system as recited in claim 1, further comprising a host data center, including one or more databases, configured to provide at least one service selected from the group consisting of: account screening for card issuance, card database management, payment processing including authorization, financial settlement and reconciliation, returns management and collection.

14. A system as recited in claim 1, wherein said DDAs are associated with the cardholders, the issuing merchants, or third-parties associated with the issuing merchants.

15. A system as recited in claim 1, wherein at least one of the DDAs comprises a checking account of a consumer; and wherein said programming further configures the network-enabled computer to collect personal identification from the consumer to become qualified for utilizing a payment card associated with the DDA information, and wherein the DDA information includes a bank account number and a routing number.

16. A system for facilitating electronic funds transactions using interoperable payment cards between one or more cardholders and one or more merchants, the system comprising:

one or more payment cards containing point-of-sale readable account information, configured to be issued to the one or more cardholders within a merchant-issued card program;

wherein said one or more payment cards are associated with one or more respective account numbers that begin with unique International Standards Organization (ISO) identification number, which are assigned for the merchant-issued card program;

wherein said one or more payment cards are configured to be issued by the one or more merchants, participating in said merchant-issued card program as one or more issuing merchants, to the one or more cardholders with privileges to execute purchase transactions interoperably at any of the one or more merchants;

one or more point-of-sale transaction terminals respectively associated with at least some of said one or more merchants, acting as acquiring merchants, and configured to interoperably receive said payment card as a form of payment, without interconnecting their respective proprietary transaction execution systems;

a network-enabled computer having an associated payment card data base within the merchant-issued card program and adapted for communicating through non-proprietary card processing services with the one or more point-of-sale transaction terminals;

wherein said payment card data base is configured to be loaded with information for accessing one or more respective valid demand deposit accounts (DDAs) associated with the account numbers before said one or more payment cards will be accepted for payment at the one or more point-of-sale transaction terminals; and programming associated with said computer, wherein said programming configures the computer to:

receive respective transaction information from the one or more point-of-sale transaction terminals in response to an attempted purchase transactions by said one or more cardholders using said respective payment cards, execute one or more of said purchase transactions utilizing an automated clearing house (ACH) network in response to respective DDA information retained for said payment cards, in response to determining that the payment cards and purchase transactions are valid, settle one or more of the purchase transactions after execution of said one or more purchase transactions, through a card processing service, from funds retained within one or more DDAs associated with one or more of the respective payment cards associated with the one or more purchase transactions, and charge one or more acquiring merchants a fee for executing said one or more purchase transactions.

17. A system as recited in claim 16, wherein said programming further configures the network-enabled computer to share transaction information with qualifying merchants participating in said merchant-issued card program as issuing merchants and/or acquiring merchants.

18. A system as recited in claim 17, wherein said programming further configures the network-enabled computer to share a higher level of transaction information access with issuing merchants than with acquiring merchants.

19. A system as recited in claim 16, wherein said programming further configures the network-enabled computer to share transaction information with qualifying issuing merchants participating in said merchant-issued card program.

20. A system as recited in claim 16, wherein said payment cards are branded by one or more of said merchants or one or more third parties with an indicia and trade dress to advertise and enhance recognition of the one or more said merchants in a marketplace.

21. A system as recited in claim 16, wherein said network-enabled computer is configured to enable the issuing merchants to qualify one or more cardholders to whom they issue payment cards and to assume at least a portion of the responsibility for transactions of the one or more cardholders qualified by the issuing merchants.

22. A system as recited in claim 16, wherein at least one of said payment cards is co-issued by an issuing merchant and a guarantor entity; wherein said guarantor entity provides a guarantee to acquiring merchants as to the payment of executed transactions; and wherein said guarantee is made to said issuing merchant by said guarantor in exchange for monetary considerations thereof.

23. A system as recited in claim 16, wherein said programming further configures the network-enabled computer to validate a respective payment card in response to receiving a personal identification number (PIN) before executing one or more respective purchase transactions based on the respective payment card.

24. A system as recited in claim 16, wherein said programming further configures the network-enabled computer to enable the issuing merchants to control issuance of payment cards from which transactions can be executed at merchants that have signed up in the merchant-issued card program as acquiring merchants.

25. A system as recited in claim 16, wherein said programming further configures the network-enabled computer to evaluate requested purchase transactions in relation to predetermined account limitations prior to executing said purchase transactions.

26. A system as recited in claim 16, wherein said programming further configures the network-enabled computer to request card processing services to be performed by a third party processor or by a merchant which provides its own card processing services and is linked directly to the network-enabled computer of the merchant-issued card program.

27. A system as recited in claim 16, further comprising a host data center, including one or more databases, configured to provide at least one service selected from the group consisting of: account screening for card issuance, card database management, payment processing including authorization, financial settlement and reconciliation, returns management and collection.

28. A system as recited in claim 16, wherein said DDAs are associated with the cardholders, the issuing merchants, or third-parties associated with the issuing merchants.

29. A system as recited in claim 16, wherein at least one of the DDAs comprises a checking account of a consumer; and wherein said programming further configures the network-enabled computer to collect personal identification from the consumer to become qualified for utilizing a payment card associated with the DDA information, and wherein the DDA information includes a bank account number and a routing number.

30. A system for facilitating electronic funds transactions using interoperable payment cards between one or more cardholders and one or more merchants, the system comprising:

one or more payment cards containing point-of-sale readable account information, configured to be issued to the one or more cardholders within a merchant-issued card program;

wherein said one or more payment cards are associated with one or more respective account numbers that begin with unique International Standards Organization (ISO) identification number, which are assigned for the merchant-issued card program;

wherein said one or more payment cards are configured to be issued by the one or more merchants, participating in said merchant-issued card program as one or more issuing merchants, to the one or more cardholders with privileges to execute purchase transactions interoperably at any of the one or more merchants acting as acquiring merchants; and a network-enabled computer having an associated payment card data base within the merchant-issued card program and adapted for communication through card processing services with one or more point-of-sale transaction terminals to receive transaction information from the one or more point-of-sale transaction terminals, the network-enabled computer being further configured to: execute a transaction using an automated clearing house (ACH) network in response to demand deposit account (DDA) information previously loaded into said payment card data base, to settle the transaction from funds from a DDA account associated with a payment card used in said transaction, and to charge an acquiring merchant a fee for executing said transaction.

31. A system as recited in claim 30, wherein the network-enabled computer is further configured to share transaction information with qualifying merchants participating in said merchant-issued card program as issuing merchants and/or acquiring merchants.

32. A system as recited in claim 31, wherein the network-enabled computer is further configured to share a higher level of transaction information access with issuing merchants than with acquiring merchants.

33. A system as recited in claim 30, wherein the network-enabled computer is further configured to share transaction information with qualifying issuing merchants participating in said merchant-issued card program.

34. A system as recited in claim 30, wherein said payment cards are branded by one or more of said merchants or one or more third parties with an indicia and trade dress to advertise and enhance recognition of the one or more said merchants in a marketplace.

35. A system as recited in claim 30, wherein said network-enabled computer is further configured to enable the issuing merchants to qualify one or more cardholders to whom they issue payment cards and to assume at least a portion of the responsibility for transactions of the one or more cardholders qualified by the issuing merchants.

36. A system as recited in claim 30, wherein at least one of said payment cards is co-issued by an issuing merchant and a guarantor entity; wherein said guarantor entity provides a guarantee to acquiring merchants as to the payment of executed transactions; and wherein said guarantee is made to said issuing merchant by said guarantor in exchange for monetary considerations thereof.

37. A system as recited in claim 30, wherein the network-enabled computer is further configured to validate a respective payment card in response to receiving a personal identification number (PIN) before executing one or more respective purchase transactions based on the respective payment card.

38. A system as recited in claim 30, wherein the network-enabled computer is further configured to enable the issuing merchants to control issuance of payment cards from which transactions can be executed at merchants that have signed up in the merchant-issued card program as acquiring merchants.

39. A system as recited in claim 30, wherein the network-enabled computer is further configured to evaluate requested purchase transactions in relation to predetermined account limitations prior to executing said purchase transactions.

40. A system as recited in claim 30, wherein the network-enabled computer is further configure to request card processing services to be performed by a third party processor or by a merchant which provides its own card processing services and is linked directly to the network-enabled computer of the merchant-issued card program.

41. A system as recited in claim 30, further comprising a host data center, including one or more databases, configured to provide at least one service selected from the group consisting of: account screening for card issuance, card database management, payment processing including authorization, financial settlement and reconciliation, returns management and collection.

42. A system as recited in claim 30, wherein said DDAs are associated with the cardholders, the issuing merchants, or third-parties associated with the issuing merchants.

43. A system as recited in claim 30, wherein at least one of the DDAs comprises a checking account of a consumer; and wherein the network-enabled computer is further configured to collect personal identification from the consumer to become qualified for utilizing a payment card associated with the DDA information, and wherein the DDA information includes a bank account number and a routing number.

* * * * *

UNITED STATES PATENT AND TRADEMARK OFFICE
CERTIFICATE OF CORRECTION

PATENT NO. : 7,775,426 B2  Page 1 of 1
APPLICATION NO. : 11/507938
DATED : August 17, 2010
INVENTOR(S) : David K. Paul et al.

It is certified that error appears in the above-identified patent and that said Letters Patent is hereby corrected as shown below:

In claim 1, column 20, line 55, please correct "begin with unique International Standards" to read "begin with a unique International Standards".

In claim 16, column 22, line 61, please correct "begin with unique International Standards" to read "begin with a unique International Standards".

In claim 30, column 24, line 54, please correct "begin with unique International Standards" to read "begin with a unique International Standards".

Signed and Sealed this

Twenty-eighth Day of September, 2010

David J. Kappos
*Director of the United States Patent and Trademark Office*